United States Patent
Boisseau et al.

(12) 
(10) Patent No.: US 6,897,251 B2
(45) Date of Patent: May 24, 2005

(54) CLEARCOAT COMPOSITIONS AND METHOD OF REDUCING THE ABILITY OF RAIN TO BEAD ON A FILM OF THE CLEARCOAT COMPOSITION

(75) Inventors: John E. Boisseau, Bloomfield Hills, MI (US); Paul Deskovitz, Woodhaven, MI (US)

(73) Assignee: BASF Corporation, Southfield, MI (US)

(*) Notice: Subject to any disclaimer, the term of this patent is extended or adjusted under 35 U.S.C. 154(b) by 0 days.

(21) Appl. No.: 10/065,805

(22) Filed: Nov. 21, 2002

(65) Prior Publication Data

US 2004/0102552 A1 May 27, 2004

(51) Int. Cl.$^7$ ............... C08J 3/00; C08K 3/20; C08K 5/41; C08L 75/00; B32B 27/40
(52) U.S. Cl. ............... 524/155; 428/423.1; 524/590; 524/591; 524/839; 524/840
(58) Field of Search ............... 524/155, 590, 524/591, 839, 840; 428/423.1

(56) References Cited

U.S. PATENT DOCUMENTS

| | | | |
|---|---|---|---|
| 4,139,514 A | * | 2/1979 | Bassett |
| 4,263,352 A | | 4/1981 | Kaltenbach et al. |
| 5,015,555 A | | 5/1991 | Lazaar ............... 430/281 |
| 5,618,586 A | | 4/1997 | Swarup et al. ............ 427/407.1 |
| 5,914,367 A | | 6/1999 | Dordick et al. ............ 525/54.1 |
| 5,989,698 A | | 11/1999 | Mrozinski et al. ........ 428/315.7 |
| 6,403,703 B1 | | 6/2002 | Slone ............... 524/832 |
| 6,544,651 B2 | * | 4/2003 | Wong et al. |

FOREIGN PATENT DOCUMENTS

| | | | |
|---|---|---|---|
| EP | 0 694 569 | 7/1995 | ............ C08G/18/62 |
| WO | WO99/09104 | 2/1999 | ............ C09D/5/02 |

* cited by examiner

Primary Examiner—Patrick D. Niland

(57) ABSTRACT

A clearcoat composition and method reduce the ability of rain to bead on a film of the clearcoat. The clearcoat includes a resin, a cross-linking agent reactive with the resin, and a water-soluble surfactant. Upon exposure of the film to the rain, the surfactant reduces the ability of the rain to bead on the film and certain properties, such as resistance to etch from acid rain, are improved.

50 Claims, No Drawings

CLEARCOAT COMPOSITIONS AND METHOD OF REDUCING THE ABILITY OF RAIN TO BEAD ON A FILM OF THE CLEARCOAT COMPOSITION

BACKGROUND OF INVENTION

Clearcoat compositions are known in the automotive industry. As is understood by those skilled in the art, clearcoat compositions are used in combination with basecoat compositions to provide a protective and decorative coating for vehicles and the like. The clearcoat composition and the basecoat composition are cured or set, either together or independently, to form a film on the vehicle.

An outermost portion of the film includes the clearcoat composition. As a result, the clearcoat composition is consistently exposed to environmental elements, especially as acid rain. Acid rain cause a visible etch defect on a surface of the film by attacking the clearcoat composition with an acid hydrolysis reaction. Typically, for the etch defect to occur, the acid rain must bead, i.e., form discrete droplets of rain, on the film such that the concentration of acid at any particular point on the film is intense enough to initiate and propagate the etch defect. On the other hand, if the acid rain does not bead on the film, then the acid in the acid rain is sufficiently dissipated across the film and the concentration of acid at any particular point on the film is not intense enough to initiate and propagate the etch defect.

Various chemistries for the clearcoat composition are particularly susceptible to etch from acid rain. For example, one chemistry, commonly referred to as a high solids clearcoat chemistry, is unable to adequately resist etch from acid rain because it is reliant on an acrylic resin with hydroxyl functional groups and a melamine cross-linking agent. In this chemistry, the cross-linked ether bond formed between the acrylic resin and the melamine cross-linking agent is susceptible to the degrading acid hydrolysis reaction. As described above, the acid hydrolysis reaction results from the concentrations of acid present in acid rain attacking the film. The acid hydrolysis reaction generally weakens the film and reveals itself in the form of the etch defect visible on the film.

Various attempts have been made to combat this acid hydrolysis reaction. As a result, many types of "etch-resistant" clearcoat compositions are known in the art. For instance, some alternative chemistries that are resistant to the acid hydrolysis reaction have been developed. Unfortunately, these chemistries are considerably expensive and other properties, including the workability or application window of the clearcoat composition and also the overall appearance, i.e., gloss and distinctness of image (DOI), of the film have been negatively impacted. One example of such an alternative chemistry is a clearcoat composition that is based on silane chemistry.

Other attempts at combating acid etch include increasing the glass transition temperature ($T_g$) of the resin or resins in the clearcoat composition such that the film is more resistant to etch from acid rain. Although increasing the $T_g$ does improve the resistance to etch, there are drawbacks to this approach. Increasing the $T_g$ of the resin can increase the cost of the resin and may reduce the performance of the film relative to other physical properties, such as cyclic cracking. Furthermore, it is known throughout the industry that the marginal improvements that have been with respect to acid etch resistance as a result of increasing the $T_g$ of the resin are still not considered acceptable.

Finally, certain after-market products have been introduced that may improved resistance to acid rain by reducing the ability of the acid rain to bead on the surface of the film. These after-market products, such as waxes, polishes, and the like, are typically hand-applied to the film by an owner of the vehicle. These products are particularly deficient in that their solution to the acid etch problem is not permanent. That is, because these products wear off, they are unable to permanently and continuously prevent the acid rain from beading on the film. These products are not "built in" to the clearcoat compositions that are used to form the film.

Due to the deficiencies in the prior art clearcoat compositions, including those described above, it is desirable to provide a unique clearcoat composition and a unique method that adopt an inexpensive and direct approach to reduce the ability of rain to bead on a film of the clearcoat composition such that certain properties, such as resistance to etch from acid rain, are improved.

SUMMARY OF INVENTION

A clearcoat composition and a method are disclosed. The clearcoat composition reduces the ability of rain to bead on a film of the clearcoat composition. The method also reduces the ability of the rain to bead on the film.

The clearcoat composition includes a resin having a functional group, a cross-linking agent reactive with the functional group of the resin, and a water-soluble surfactant. The method of the subject invention provides the resin and incorporates the cross-linking agent with the resin to form an intermediate composition. The water-soluble surfactant is incorporated into the intermediate composition to form the clearcoat composition. The water-soluble surfactant reduces the ability of the rain to bead on the film and resistance to etch is improved.

Accordingly, the clearcoat composition and method of the subject invention adopt an inexpensive and direct approach of reducing the ability of the rain to bead on the film of the clearcoat composition. Consequently, certain properties, such as the resistance to etch from acid rain, are improved.

DETAILED DESCRIPTION

A clearcoat composition according to the subject invention reduces the ability of rain to bead on a film of the clearcoat composition. The method of the subject invention also reduces the ability of the rain to bead on the film of the clearcoat composition. As described in more detail below, because the clearcoat composition reduces the ability of the rain to bead on the film, the clearcoat composition generally has improved resistance to etch from acid rain, i.e., acid etch, although whether or not the clearcoat composition exhibits improved resistance to etch from acid rain does not effect the scope of the subject application. For example, even if the clearcoat composition of the subject invention does not achieve improved resistance to etch, it may improve other properties such as sheeting action and film cleanliness (see below). Also, because improved resistance to acid etch is one focus of the subject invention, the rain is hereinafter referred to as acid rain. However, it is to be understood that there is no requirement that the rain include substantial, if any, concentrations of acid for the subject invention to be applicable.

The improved resistance, if any, is as a result of a reduction in the ability of the acid rain to bead on a film of the clearcoat composition. Because the acid rain cannot bead on the film of the clearcoat composition of the subject invention, a concentration of the acid rain on the film is sufficiently dissipated across the film and an etch defect does not form on the film. That is, the concentration of acid at any particular point on the film is not intense enough to initiate and propagate the etch defect. The method of the subject invention improves the resistance of the film to etch from the acid rain by reducing the ability of the acid rain to bead on the film.

The clearcoat composition includes a resin having a functional group, a cross-linking agent reactive with the functional group of the resin, and a water-soluble surfactant. As described additionally below, the water-soluble surfactant is the component of the clearcoat composition that is responsible for reducing the ability of the acid rain to bead on the film. The resin, the cross-linking agent, and the water-soluble surfactant are also described below. The method of the subject invention provides the resin, incorporates the cross-linking agent with the resin to form an intermediate composition, and incorporates the water-soluble surfactant into the intermediate composition to form the clearcoat composition. The order of incorporation or addition is not critical to the novelty of the subject invention. As a result, it is to be understood that, for the purposes of the subject invention, it is equivalent to add, or otherwise incorporate, these three components in different orders. For example, the water-soluble surfactant may first be incorporated with the resin and then the cross-linking agent may be incorporated with the water-soluble surfactant and the resin, or the water-soluble surfactant may first be incorporated with the cross-linking agent and then the resin may be incorporated with the water-soluble surfactant and the cross-linking agent.

The clearcoat composition of the subject invention may be, but is not necessarily limited to, solventborne and waterborne clearcoat compositions, refinish and OEM-type clearcoat compositions, and powder and powder slurry clearcoat compositions. In any event the clearcoat composition may be either a thermosetting clearcoat composition or a thermoplastic, i.e., laquer-type, clearcoat composition. If the clearcoat composition is a thermosetting clearcoat composition, then the film that is provided is a cured, or cross-linked, film. On the other hand, if the clearcoat composition is a thermoplastic clearcoat composition, then the film that is provided is simply a set film.

Importantly, the primary industry that the subject invention is applied in is the automotive coating or topcoat industry such that it is most preferred that the clearcoat composition is a thermosetting clearcoat composition that is curable and cross-linkable to provide a film that cross-links upon cure, preferably at elevated temperatures known to those skilled in the art. Accordingly, for descriptive purposes only, the subject invention will primarily be described in the context that the clearcoat composition is cross-linkable and in the context that the film is a film that has been cured.

The resin included in the clearcoat composition can be any one of, or a combination of, a wide variety of resins. Preferably, the resin is selected from the group consisting of acrylic resins, polyester resins, polyurethane resins, epoxy resins, phenolic resins, carbamate resins, and combinations thereof. Alternatively, low molecular weight chemicals or oligomers may also be used, providing the low molecular weight chemicals or oligomers have an appropriate type and number of functional groups as would be understood by those skilled in the art. The most preferred resin for incorporation into the clearcoat composition is an acrylic resin. The resin includes the functional group. In fact, it is possible that the resin includes more than one functional group. Suitable functional groups include, but are not limited to, hydroxy, phenol, isocyanate, acid, amine, carboxyl, epoxy, acrylate, vinyl, silane, anhydride, mercaptan, carbamate, carbonate, and acetoacetate functional groups. The functional groups may be masked or blocked in such a manner that they become unblocked, and therefore available for cross-linking, under preferred cure conditions, such as the elevated temperatures referenced above. The most preferred functional groups are hydroxy and carbamate functional groups such that the most preferred resin is a hydroxy-functional acrylic resin and/or a carbamate-functional acrylic resin. As will be described additionally below, the water-soluble surfactant is effective in resisting acid etch even where the resin is not a resin having a high glass transition temperature ($T_g$). Accordingly, it is preferred that the resin or resins included in the clearcoat composition have a $T_g$ of from 100° C. or less. More preferably, the $T_g$ of the resin or resins is from 75° C. to 100° C. No matter what the case, the resin, or resins, are preferably present in the clearcoat composition in amount from 3 to 95, more preferably from 40 to 80, parts by weight based on 100 parts by weight of the clearcoat composition.

The cross-linking agent is incorporated with the resin to form an intermediate composition. More specifically, the cross-linking agent included in the clearcoat composition is selected to be reactive with the functional group of the resin. Accordingly, the cross-linking agent is preferably selected from the group consisting of aminoplasts, isocyanates, polycarboxylic acids, acid anhydrides, polyamines, polyphenols, epoxy resins, and combinations thereof. The aminoplasts primarily include urea-formaldehyde and melamine-formaldehyde resins, and the isocyanates may be blocked or unblocked. The most preferred cross-linking agent for incorporation into the clearcoat composition is a melamine-formaldehyde resin that cross-links with the most preferred hydroxy-functional acrylic resin. Preferably, the cross-linking agent is present in an amount from 3 to 50, more preferably from 10 to 30, parts by weight based on 100 parts by weight of the clearcoat composition.

The water-soluble surfactant is incorporated into the intermediate composition formed by the resin and the cross-linking agent to form the clearcoat composition. As is understood by those skilled in the art, surfactants are amphipathic molecules, i.e., they have both a (1) polar and hydrophilic characteristic and a (2) non-polar and hydrophobic characteristic. As a result of (2), the non-polar and hydrophobic characteristic, the overwhelming majority of surfactant are not soluble in water. However, unlike most surfactants known to those skilled in the art, the surfactant utilized in the subject invention is water-soluble. In fact, it is most preferred that the water-soluble surfactant is infinitely soluble in water. With this significant water-solubility, it is believed that the water-soluble surfactant is able to migrate, i.e., release, out from the cured film of the clearcoat composition upon exposure to acid rain. The water-soluble surfactant migrates toward an outermost surface of the cured film to interact with any acid rain on the surface of the cured film. As the water-soluble surfactant migrates out from the cured film, it lowers a surface tension of the acid rain relative to a surface tension of the cured film. As a result, the ability of the acid rain to bead on the cured film is reduced. Instead, the acid rain "wets" or essentially covers the cured film without forming discrete droplets. That is, the acid rain cannot bead on the film formed by the clearcoat composition of the subject invention, and as described above, because the acid rain cannot bead, the concentration of acid at any particular point on the film is not intense enough to initiate and propagate the etch defect. Instead, any point stresses that would be responsible for the initiation and the propagation of the etch defect are dissipated, and ultimately the resistance to etch is improved. It is also believed to be possible that the water-soluble surfactant remains anchored to and within the film and, because the water-soluble surfactant possesses certain polar characteristics, the water-soluble surfactant causes a change in a contact angle of any rain, i.e., water, present on the film.

In one embodiment, the water-soluble surfactant is of the general formula:

where R is a branched or unbranched, cyclic or non-cyclic, chain comprising carbon, oxygen, and hydrogen atoms. In another more specific embodiment of the subject invention, the water-soluble surfactant is of the formula:

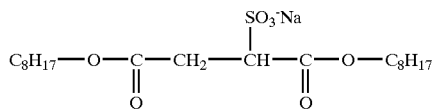

In yet a further embodiment, the water-soluble surfactant is a sulfosuccinate. If the water-soluble surfactant is a sulfosuccinate, then it is preferred that the sulfosuccinate is a sodium alkyl sulfosuccinate. If the sulfosuccinate is a sodium alkyl sulfosuccinate, then it is preferred that the sodium alkyl sulfosuccinate is either sodium dioctyl sulfosuccinate or sodium bis(2-ethyhexyl) sulfosuccinate.

It is further preferred that the water-soluble surfactant is an anionic surfactant where a hydrophilic head of the surfactant is negatively charged, and also that the water-soluble surfactant is a liquid surfactant. As a liquid surfactant, the water-soluble surfactant can be optimally incorporated into the intermediate composition with the resin and the cross-linking agent. Although it is preferred that the water-soluble surfactant is a liquid surfactant for optimal incorporation into the intermediate composition, it is to be understood that at increased non-volatile (NV) levels (e.g. 100%), certain water-soluble surfactants are waxy solids.

As for physical properties, it is preferred that the water-soluble surfactant have a water solubility of at least 0.5%. That is, it is preferred that the water-soluble surfactant has a water solubility of 0.5 grams of the water-soluble surfactant in 100 ml of water at 25° C. It is more preferred that the water-soluble surfactant have a water solubility of from 1.5 to 100% at 25° C. At 100%, the water-soluble surfactant is infinitely soluble. No matter what particular water-soluble surfactant is incorporated into the intermediate composition, the water-soluble surfactant is preferably present in an amount from 0.01 to 5, more preferably 0.1 to 0.5, parts by weight based on 100 parts by weight of the clearcoat composition. It is to be understood that, within the context of the subject invention, a surfactant is considered insoluble if it is either immiscible in water or has a water solubility less than 0.5% at 25° C. It is to be understood that typical surfactants, including, but not limited to, polyacrylate- and polysiloxane-based surfactants, that have historically been used in clearcoat compositions throughout the automotive coating or topcoat industry, are insoluble within the context of the subject invention.

It is contemplated that the surfactants suitable for incorporation into the clearcoat composition of the subject invention include, but are not limited to, sodium dihexyl sulfosuccinate, various half-esters of sulfosuccinates, various monoester sulfosuccinates, various diester sulfosuccinates, sodium dodecylbenzenesulfonate (DBS, SDS), various sodium alkyldiphenyletherdisulfonates, various sodium alkylnaphthalenesulfonates, various sodium dialkyl sulfosuccinates, sodium bistridecyl sulfosuccinate, sodium dicyclohexyl sulfosuccinate, sodium diamyl sulfosuccinate, sodium diisobutyl sulfosuccinate, disodium ethoxylated alcohol half ester of sulfosuccinic acid, disodium ethoxylated nonyl phenol half ester of sulfosuccinic acid, disodium isodecyl sulfosuccinate.

Although the water-soluble surfactant may be, by itself, infinitely soluble in water as described above, it is possible that the water-soluble surfactant is combined with a solvent prior to incorporation of the water-soluble surfactant into the intermediate composition to further enhance the water-solubility of the surfactant. This solvent may also function to optimize the step of incorporating the water-soluble surfactant in the intermediate composition. If included, the solvent is preferably selected from the group consisting of water, glycol, isopropyl alcohol, ethanol, propylene glycol, polyethylene glycol, mineral spirits, and combinations thereof. Most preferably, the water-soluble surfactant is combined with a blend of water and ethanol as the solvents.

Many different water-soluble surfactants are commercially available. For example, the most preferred water-soluble surfactant is EMCOL 4500 commercially available from Witco, a subsidiary of the Crompton Corporation. Other possible water-soluble surfactants for use in the subject invention that are commercially available include, but are not limited to, Octowet Wetting Agents and Sulfosuccinates, such as Octowet 70 or Octowet 75, commercially available from Tiarco Chemical, and Aerosol® (U.S.P. Grade) Surfactants, such as Aerosol® MA-80-1 or Aerosol® 501, commercially available from Cytec Industries, Inc. Yet another possible water-soluble surfactant for use in the subject invention is Aerosol® OT 100% Surfactant which is commercially available from Cytec Industries, Inc. This particular water-soluble surfactant has a water solubility of 1.5%.

As understood by those skilled in the art, the clearcoat composition may include additional components, commonly referred to as clearcoat additives, such as ultraviolet light absorbers, hindered amine light stabilizers, surfactants, stabilizers, fillers, wetting agents, rheology control agents, dispersing agents, and adhesion promoters. While use of these additional components in clearcoat compositions is well known in the art, the amount or amounts used are varied and controlled to avoid adversely affecting various physical properties of the film provided by the clearcoat composition.

After the clearcoat composition is manufactured, it is reduced to be applied, via a process such as an air atomized application process or a rotary bell application process, to a substrate, such as a vehicle body. Typically, the clearcoat composition is reduced with reduction solvents to a suitable application viscosity. Typically, as is the case in the automotive industry, a basecoat composition is previously applied to the substrate, and the clearcoat composition is applied to the basecoat composition. For the purposes of the subject invention, the type of basecoat composition is not pertinent and does not vary the scope of the subject invention. As one example, the basecoat composition may be a waterborne basecoat composition (WBBC) and may be pre-baked, or pre-cured (i.e., flashed at a slightly elevated temperature such that water is removed, but little or no cross-linking occurs), on the substrate such that the clearcoat composition is applied to the pre-baked film of the WBBC. As a second example, the basecoat composition may be a solventborne basecoat composition (SBBC) and may be "wet" on the substrate such that the clearcoat composition is applied wet-on-wet to the SBBC. If, as in the most preferred embodiment of the subject invention, the clearcoat composition is curable and cross-links to form the cured film, then the particular cure conditions are known to those skilled in the art. One example is a bake at 265 to 325° F. for 25 to 35 minutes.

In addition to improved resistance to acid rain certain other properties may also be improved as a result of the subject invention. For example, the film may exhibit increased sheeting action and may exhibit a potential for a cleaner film that is free of dust and dirt particles, and the like. With clearcoat compositions that have water-insoluble surfactants, the sheeting action of the film is insufficient because the rain leaves the film in a disorderly fashion leaving random areas of puddled water and rain droplets. On the other hand, with the clearcoat composition of the subject invention, the sheeting action of the film is improved because the rain leaves the film in an orderly fashion where the water has a tendency to coalesce and leave the film as a single entity, i.e., like a curtain or sheet being pulled off the film in one swift movement. Also, because the water-soluble surfactant of the subject invention establishes a hydrophilic film, hydrophobic particles including dust and dirt particles, and the like, tend to be repelled from the film thereby keeping the coated substrate cleaner.

It is to be understood that all of the preceding chemical representations are merely two-dimensional chemical representations and that the actual dimensional structure of these chemical representations may be other than as indicated.

The following examples illustrating the formation of and the use of the clearcoat composition of the subject invention, as presented herein, are intended to illustrate and not to limit the invention.

EXAMPLE

The clearcoat composition examples, including the water-soluble surfactant, were prepar by adding and reacting the following parts, by weight, unless otherwise indicated.

| Component | Ex. 1 Control 1 Amount (grams) | Ex. 2 Amount (grams) | Ex. 3 Control 2 Amount (grams) | Ex. 4 Amount (grams) |
| --- | --- | --- | --- | --- |
| R10CG062 (Batch No. 388232) Clearcoat Composition | 100.000 | 100.000 | 100.000 | 100.000 |
| Water-Soluble Surfactant | 0.000 | 0.225 | 0.000 | 0.225 |
| Total | 100.000 | 100.225 | 100.000 | 100.225 |
| Substrate | 12 × 4" Panel | 12 × 4" Panel | Vehicle Hood | Vehicle Hood |
| E54KW119 Basecoat | Yes | Yes | Yes | Yes |
| Clearcoat Cure Temperature | 275° F. | 275° F. | 275° F. | 275° F. |
| Acid Etch | Puerto Rico | Puerto Rico | Jacksonville | Jacksonville |

| Component | Ex. 1 Control 1 Amount (grams) | Ex. 2 Amount (grams) | Ex. 3 Control 2 Amount (grams) | Ex. 4 Amount (grams) |
| --- | --- | --- | --- | --- |
| Exposure Site | | | Florida | Florida |
| Acid Etch Rating (15 week) | 6 | 4 | — | — |
| Acid Etch Rating (14 Week) | — | — | 4 | 3 |

R10CG062 is a clearcoat composition with a carbamate resin and a melamine-formaldehyde cross-linking agent. R10CG062 is available from BASF Corporation, Southfield, Mich.

Water-Soluble Surfactant is a sodium alkyl sulfosuccinate commercially available as EMCOL 4500 from Witco, a subsidiary of the Crompton Corporation.

E54 KW119 Basecoat is a black waterborne basecoat (WBBC) commercially available from BASF Corporation, Southfield, Mich.

0.45% of surfactant was added to the clearcoat composition based on the pre-reduction wt. % solids of the clearcoat composition. Accordingly, R10CG062 has a 50.0 wt. % solids, so 0.225 grams of the water-soluble surfactant was added. Importantly, EMCOL 4500 is only 70.0 wt. % of sodium bis(2-ethyhexyl) sulfosuccinate in 24.0 wt. % water and 6.0 wt. % ethanol such that only 0.1575 grams of the 0.225 grams added to the R10CG062 clearcoat composition was actually the water-soluble surfactant, sodium bis(2-ethyhexyl) sulfosuccinate.

For Example 1 (Control 1) and Example 2, E54KW119 was spray applied to 0.7–0.9 mils onto 4×12" panels and pre baked at conditions known to those skilled in the art for WBBCs. Then, the reduced clearcoat composition, including the water-soluble surfactant (Example 2 only), was spray applied to 1.82.0 mils onto the E54 KW119. The panels were cured at 275° F. for 30 minutes and were then exposed at an Acid Etch Exposure site in Puerto Rico. After 15 weeks, the panels were visually evaluated to determine an Acid Etch Rating on a 0–10 Scale, with a rating of 0 being the best, a rating of 10 being the worst, and ratings of 5 or less generally acceptable in the automotive industry. Example 1, the control, had an Acid Etch Rating of 6 which is unacceptable and Example 2, with the water-soluble surfactant, had an Acid Etch Rating of 4 which is acceptable and which is a 20% improvement in resistance to etch from acid rain over the control.

For Example 3 (Control 2) and Example 4, E54KW119 was spray applied to 0.7–0.9 mils onto actual vehicle hoods and pre-baked at conditions known to those skilled in the art for WBBCs. Then, the reduced clearcoat composition, including the water-soluble surfactant (Example 4 only), was spray applied to 1.8 2.0 mils onto the E54KW119. The hoods were cured at 275° F. for 30 minutes and were then exposed at an Acid Etch Exposure site in Jacksonville, Fla. After 14 weeks, the hoods were visually evaluated to determine an Acid Etch Rating on a 0–10 Scale, with a rating of 0 being the best, a rating of 10 being the worst, and ratings of 5 or less generally acceptable in the automotive industry. Example 3, the control, had an Acid Etch Rating of 4. On the other hand, Example 4, with the water-soluble surfactant, had an Acid Etch Rating of 3 which is a 10% improvement in resistance to etch from acid rain over the control.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A solventborne clearcoat composition that reduces the ability of rain to bead on a film of said solventborne clearcoat composition, said solventborne clearcoat composition comprising:
    a resin having a functional group;
    a cross-linking agent reactive with said functional group of said resin; and
    a water-soluble surfactant that reduces the ability of the rain to bead on the film wherein said water-soluble surfactant is of the general formula,

where R is a branched or unbranched, cyclic or non-cyclic, chain comprising carbon, oxygen, and hydrogen atoms,
wherein said water-soluble surfactant is present in an amount from 0.15 to 5 parts by weight based on 100 parts by weight of said solventborne clearcoat composition.

2. A solventborne clearcoat composition as set forth in claim 1 wherein said water-soluble surfactant is of the formula:

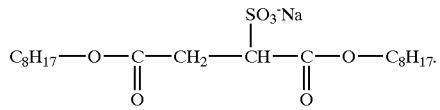

3. A solventborne clearcoat composition as set forth in claim 1 wherein said water-soluble surfactant has a water solubility of at least 0.5 grams in 100 ml of water at 25° C.

4. A solventborne clearcoat composition as set forth in claim 1 wherein said water-soluble surfactant migrates out from the film of said solventborne clearcoat composition to lower a surface tension of the rain relative to a surface tension of the film for reducing the ability of the rain to bead on the film.

5. A solventborne clearcoat composition as set forth in claim 1 wherein said water-soluble surfactant is infinitely soluble in water.

6. A solventborne clearcoat composition that reduces the ability of rain to bead on a film of said solventborne clearcoat composition, said solventborne clearcoat composition comprising:
    a resin having a functional group;
    a cross-linking agent reactive with said functional group of said resin; and
    a water-soluble surfactant that reduces the ability of the rain to bead on the film,
    wherein said water-soluble surfactant is present in an amount from 0.15 to 5 parts by weight based on 100 parts by weight of said solventborne clearcoat composition.

7. A solventborne clearcoat composition as set forth in claim 6 wherein said water-soluble surfactant is of the general formula:

where R is a branched or unbranched, cyclic or non-cyclic, chain comprising carbon, oxygen, and hydrogen atoms.

8. A solventborne clearcoat composition as set forth in claim 6 wherein said water-soluble surfactant is of the formula:

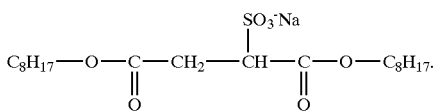

9. A solventborne clearcoat composition as set forth in claim 6 wherein said water-soluble surfactant is further defined as a sulfosuccinate.

10. A solventborne clearcoat composition as set forth in claim 9 wherein said sulfosuccinate is further defined as a sodium alkyl sulfosuccinate.

11. A solventborne clearcoat composition as set forth in claim 10 wherein said sodium alkyl sulfosuccinate is further defined as sodium dioctyl sulfosuccinate.

12. A solventborne clearcoat composition as set forth in claim 10 wherein said sodium alkyl sulfosuccinate is further defined as sodium bis(2-ethyhexyl) sulfosuccinate.

13. A solventborne clearcoat composition as set forth in claim 6 wherein said water-soluble surfactant has a water solubility of at least 0.5 grams in 100 ml of water at 25° C.

14. A solventborne clearcoat composition as set forth in claim 6 wherein said water-soluble surfactant is infinitely soluble in water.

15. A solventborne clearcoat composition as set forth in claim 6 wherein said water-soluble surfactant is further defined as an anionic surfactant.

16. A solventborne clearcoat composition as set forth in claim 6 wherein said water-soluble surfactant is present in an amount from 0.15 to 0.5 parts by weight based on 100 parts by weight of said solventborne clearcoat composition.

17. A solventborne clearcoat composition as set forth in claim 6 wherein said water-soluble surfactant is in combination with a solvent.

18. A solventborne clearcoat composition as set forth in claim 17 wherein said solvent is selected from the group consisting of water, glycol, isopropyl alcohol, ethanol, propylene glycol, polyethylene glycol, mineral spirits, and combinations thereof.

19. A solventborne clearcoat composition as set forth in claim 6 wherein said resin is selected from the group consisting of acrylic resins, polyester resins, polyurethane resins, epoxy resins, phenolic resins, carbamate resins, and combinations thereof.

20. A solventborne clearcoat composition as set forth in claim 6 wherein said resin is present in an amount from 3 to 95 parts by weight based on 100 parts by weight of said solventborne clearcoat composition.

21. A solventborne clearcoat composition as set forth in claim 6 wherein said cross-linking agent is selected from the group consisting of aminoplasts, isocyanates, polycarboxylic acids, acid anhydrides, polyamines, polyphenols, epoxy resins, and combinations thereof.

22. A solventborne clearcoat composition as set forth in claim 6 wherein said cross-linking agent is present in an amount from 3 to 50 parts by weight based on 100 parts by weight of said solventborne clearcoat composition.

23. A solventborne clearcoat composition as set forth in claim 6 having a resistance to etch from the rain that is improved by from 5 to 25%.

24. A solventborne clearcoat composition as set forth in claim 6 wherein said solventborne clearcoat composition is a thermosetting clearcoat composition such that the film provided by said thermosetting clearcoat composition is a cured film.

25. A solventborne clearcoat composition as set forth in claim 6 wherein said solventborne clearcoat composition is a thermoplastic clearcoat composition such that the film provided by said thermoplastic clearcoat composition is a thermoplastically-set film.

26. A cured film formed by said thermosetting clearcoat composition of claim 24.

27. A substrate having the cured film formed by said thermosetting clearcoat composition of claim 24.

28. A solventborne clearcoat composition as set forth in claim 6 wherein said water-soluble surfactant migrates out from the film of said solventborne clearcoat composition to lower a surface tension of the rain relative to a surface tension of the film for reducing the ability of the rain to bead on the film.

29. A method of reducing the ability of rain to bead on a film of a clearcoat composition, wherein the clearcoat composition comprises a resin having a functional group, a cross-linking agent reactive with the functional group of the resin, and a water-soluble surfactant and said method comprises the steps of:
   providing the resin;
   incorporating the cross-linking agent with the resin to form an intermediate composition; and
   incorporating the water-soluble surfactant into the intermediate composition to form the clearcoat composition such that, upon exposure to the rain, the water-soluble surfactant reduces the ability of the rain to bead on the film.

30. A method as set forth in claim 29 wherein the step of incorporating the water-soluble surfactant is further defined as incorporating a water-soluble surfactant of the general formula:

where R is a branched or unbranched, cyclic or non-cyclic, chain comprising carbon, oxygen, and hydrogen atoms.

31. A method as set forth in claim 29 wherein the step of incorporating the water-soluble surfactant is further defined as incorporating a water-soluble surfactant of the formula:

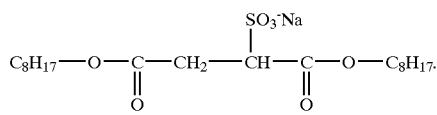

32. A method as set forth in claim 29 wherein the step of incorporating the water-soluble surfactant is further defined as incorporating a sulfosuccinate into the intermediate composition to form the clearcoat composition.

33. A method as set forth in claim 32 wherein the step of incorporating the sulfosuccinate is further defined as incorporating a sodium alkyl sulfosuccinate into the intermediate composition to form the clearcoat composition.

34. A method as set forth in claim 33 wherein the step of incorporating the sodium alkyl sulfosuccinate is further defined as incorporating sodium dioctyl sulfosuccinate into the intermediate composition to form the clearcoat composition.

35. A method as set forth in claim 33 wherein the step of incorporating the sodium alkyl sulfosuccinate is further defined as incorporating sodium bis(2-ethyhexyl) sulfosuccinate into the intermediate composition to form the clearcoat composition.

36. A method as set forth in claim 29 wherein the step of incorporating the water-soluble surfactant is further defined as incorporating from 0.01 to 5 parts by weight of the water-soluble surfactant based on 100 parts by weight of the clearcoat composition.

37. A method as set forth in claim 29 further comprising the step of combining the water-soluble surfactant with a solvent prior to incorporation of the water-soluble surfactant into the intermediate composition.

38. A method as set forth in claim 37 wherein the step of combining the water-soluble surfactant with the solvent is further defined as combining the water-soluble surfactant with a solvent selected from the group consisting of water, glycol, isopropyl alcohol, ethanol, propylene glycol, polyethylene glycol, mineral spirits, and combinations thereof, prior to incorporation of the water-soluble surfactant into the intermediate composition.

39. A method as set forth in claim 29 wherein the step of providing the resin is further defined as providing a resin selected from the group consisting of acrylic resins, polyester resins, polyurethane resins, epoxy resins, phenolic resins, carbamate resins, and combinations thereof.

40. A method as set forth in claim 29 wherein the step of providing the resin is further defined as providing from 3 to 95 parts by weight of the resin based on 100 parts by weight of the clearcoat composition.

41. A method as set forth in claim 29 wherein the step incorporating the cross-linking agent with the resin is further defined as incorporating a cross-linking agent selected from the group consisting of aminoplasts, isocyanates, polycarboxylic acids, acid anhydrides, polyamines, polyphenols, epoxy resins, and combinations thereof, to form the intermediate composition.

42. A method as set forth in claim 29 wherein the step of incorporating the cross-linking agent with the resin is further defined as incorporating from 3 to 50 parts by weight of the cross-linking agent based on 100 parts by weight of the clearcoat composition.

43. A method as set forth in claim 29 wherein the step of incorporating the water-soluble surfactant is further defined as incorporating a water-soluble surfactant having a water solubility of at least 0.5 grams in 100 ml of water at 25° C. into the intermediate composition to form the clearcoat composition.

44. A method as set forth in claim 29 wherein the step of incorporating the water-soluble surfactant is further defined as incorporating a water-soluble surfactant that is infinitely soluble in water into the intermediate composition to form the clearcoat composition.

45. A method as set forth in claim 29 wherein the step of incorporating the water-soluble surfactant is further defined as incorporating a water-soluble surfactant into the intermediate composition that migrates out from the film of the clearcoat composition to lower a surface tension of the rain relative to a surface tension of the film.

46. A solventborne clearcoat composition as set forth in claim 1 wherein said water-soluble surfactant is present in an amount from 0.15 to 0.5 parts by weight based on 100 parts by weight of said solventborne clearcoat composition.

47. A method as set forth in claim 36 wherein the step of incorporating the water-soluble surfactant is further defined as incorporating from 0.15 to 5 parts by weight of the water-soluble surfactant based on 100 parts by weight of the clearcoat composition.

48. A method as set forth in claim 47 wherein the step of incorporating the water-soluble surfactant is further defined as incorporating from 0.15 to 0.5 parts by weight of the water-soluble surfactant based on 100 parts by weight of the clearcoat composition.

49. A solventborne clearcoat composition as set forth in claim 1 wherein said resin is further defined as a polyurethane resin.

50. A solventborne clearcoat composition as set forth in claim 1 wherein said resin is further defined as a polyurethane resin.

* * * * *